(12) United States Patent
Matsusaka et al.

(10) Patent No.: US 6,732,999 B2
(45) Date of Patent: May 11, 2004

(54) ELECTROMAGNETIC VALVE DEVICE

(75) Inventors: Noboru Matsusaka, Kariya (JP);
Tomoyoshi Minami, Yokkaichi (JP);
Kenichi Oishi, Obu (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 10/224,364

(22) Filed: Aug. 21, 2002

(65) Prior Publication Data

US 2003/0038260 A1 Feb. 27, 2003

(30) Foreign Application Priority Data

Aug. 23, 2001 (JP) ............................ 2001-252753
Jun. 6, 2002 (JP) ............................ 2002-165486

(51) Int. Cl.[7] ............................................. F16K 31/02
(52) U.S. Cl. .............................. 251/129.15; 251/129.18
(58) Field of Search ........................ 251/129.15, 129.18, 251/337; 137/625.69

(56) References Cited

U.S. PATENT DOCUMENTS 4,287,906 A * 9/1981 Green et al. ........... 137/118.02
4,794,894 A * 1/1989 Gill ........................ 123/90.61
6,269,827 B1 * 8/2001 Potter ........................ 137/14
2001/0048091 A1 * 12/2001 Enomoto et al. ...... 251/129.15

FOREIGN PATENT DOCUMENTS

JP         2001-124231         5/2001

* cited by examiner

*Primary Examiner*—Gene Mancene
*Assistant Examiner*—Patrick Buechner
(74) *Attorney, Agent, or Firm*—Nixon & Vanderhye P.C.

(57) ABSTRACT

In an electromagnetic valve device having a valve housing, a valve member slidably accommodated in the valve housing to control oil communications among ports formed in the valve housing, a spring biasing the valve member, a stopper retaining the spring and an electromagnetic drive member for generating, when energized, a driving force to displace the valve member against a biasing force of the spring, the valve housing is provided at an axial end with a small diameter portion whose wall thickness is thinner and the stopper is press fitted substantially to an inner circumferential surface of the small diameter portion so that radially outward resilient deformation of the small diameter portion is larger than radially inward resilient deformation of the stopper.

3 Claims, 3 Drawing Sheets

ELECTROMAGNETIC VALVE DEVICE

CROSS REFERENCE TO RELATED APPLICATION

This application is based upon and claims the benefit of priority of Japanese Patent Applications No. 2001-252753 filed on Aug. 23, 2001 and No. 2002-165486 filed on Jun. 6, 2002, the contents of which are incorporated herein by reference.

BACKGROUND OF THE INVENTION

1. Field of the Invention

The present invention relates to an electromagnetic valve device for controlling fluid communication among a plurality of ports provided in a valve housing in such a manner that driving force of an electromagnetic drive member urges a valve body slidably disposed in the valve housing so as to be displaced against biasing force of a spring.

2. Description of the Prior Art

An electromagnetic valve device is known, in which a spool as a valve body slidably and reciprocatingly disposed in a cylindrical valve housing is displaced against biasing force of a spring by driving force of an electromagnetic drive member to control communication among a plurality of ports formed at a circumferential wall of the valve housing. The spring is retained by an end of an adjusting screw (acting as a stopper) screwed into an inner circumferential wall of the valve housing so that the biasing force of the spring is adjusted by turning the adjusting screw. For this purpose, the adjusting screw is turned until the adjusting screw reaches a predetermined position, or the adjusting screw is turned until pressure of oil flowing through the openings of the valve housing reaches a predetermined value when a given current is supplied to the electromagnetic drive member. After the adjusting screw has been turned and the biasing force of the spring has been set, the adjusting screw is fixed by staking, crimping or the like to the circumferential wall of the valve housing not to loose the screw engagement therewith.

However, the conventional valve housing and adjusting screw need higher manufacturing cost since both of the valve housing and adjusting screw are provided with threads to be engaged with each other. Further, when the adjusting screw is fixed to the valve housing by staking and the like, a position of the adjusting screw relative to the valve housing is likely displaced. To confirm no displacement of the adjusting screw, the pressure of oil of the electromagnetic valve device is again checked even after the adjusting screw has been fixed to the valve housing and, if the pressure of oil is out of the predetermined value, the electromagnetic valve is ejected as a failure, which results in higher manufacturing cost.

On the other hand, the electromagnetic valve device disclosed in JP-A-2000-124231 has a stopper for adjusting the biasing force of the spring acting on the spool, instead of the adjusting screw. The conventional stopper is formed in shape of a thin thickness wall cylinder having a bottom. The stopper is pushed into the inner circumferential wall of the valve housing by a certain length for adjusting the biasing force of the spring and, then, is fixed to the valve housing by stating or rolling in such a manner that a part of the thin thickness wall thereof is elastically deformed radially outward. Though the stopper and the valve housing are not provided with the threads, the valve housing has to be provided at inner circumference surface of the valve housing with a recess for stating or rolling. Accordingly, manufacturing cost of the electromagnetic valve device is still higher. Further, when the stopper is fixed to the housing after finishing the adjustment of the biasing force of the spring, the position of the stopper relative to the valve housing is likely to be still displaced.

SUMMARY OF THE INVENTION

To solve the problems mentioned above, it is an object of the present invention to provide an electromagnetic valve device in which a stopper for adjusting biasing force of a spring is press fitted to a valve housing at less manufacturing cost.

Another object of the present invention is to provide the electromagnetic valve device in which the stopper is fixed to the valve housing with an accurate axial position relative to the valve housing.

A further object of the present invention is to provide a method of manufacturing the electromagnetic valve device in which the stopper is accurately positioned relative to the valve housing with less number of pressing operations of the stopper into the valve housing.

To achieve the above objects, the electromagnetic valve device is composed of a valve housing having a cylindrical wall and a plurality of ports passing radially through the cylindrical wall, a valve member slidably accommodated in the cylindrical wall to control communications among the ports according to an axial displacement thereof, a spring which is positioned at the axial end of the valve housing and whose end is retained by an end of the valve member and urges the valve member toward another axial end of the valve housing, a stopper retaining another end of the spring and an electromagnetic drive member in contact with another end of the valve member for generating, when energized, a driving force to displace the valve member against a biasing force of the spring.

With the electromagnetic valve device mentioned above, the cylindrical wall is provided at an axial end with a small diameter portion whose wall thickness is thinner and the stopper is press fitted substantially to an inner circumferential surface of the small diameter portion of the cylindrical wall so that radially outward resilient deformation of the small diameter portion is larger than radially inward resilient deformation of the stopper. Even if the small diameter portion of the valve housing is expanded radially outward, the cylindrical wall where the plurality of ports are provided is not substantially deformed by the press fitting so that performance of the electromagnetic valve device is not adversely affected.

To rigidly press fit the stopper to the valve housing and to secure accurate axial position of the stopper relative to the valve housing, it is preferable that an axial length of the stopper is not shorter than 1 mm.

Further, preferably, the cylindrical wall is provided at an inner circumferential surface on a side of the axial end thereof with a small diameter inner surface, a large diameter inner surface and an inner step surface bridging the small and large diameter inner surfaces, and the stopper is provided with a large diameter outer surface press fitted to a part of the large diameter inner surface, a small diameter outer surface press fitted to a part of the small diameter inner surface and an outer step surface bridging the large and small diameter outer surfaces. A ring shaped space formed by the other part of the small diameter outer surface, the other part of the large diameter inner surface and the inner and outer step surfaces serves to accommodate chips and burrs due to press fitting. Accordingly, the chips and burrs are prevented from being mixed substantially into the oil so that the valve member can move smoothly in the valve housing for controlling oil communication among the ports.

Furthermore, in the electromagnetic valve device mentioned above, pressure of oil of the output port is variable according to the position of the valve member in the valve housing. The position of the valve member is governed by the biasing force of the spring and a driving force of the electromagnetic drive member that urges the valve member to displace against the biasing force of the spring. After the electromagnetic drive force, the valve member and the spring are assembled to the valve housing, the position of the valve member in the valve housing tends to be variable due to dimensional fluctuation based on manufacturing and assembling errors thereof so that the biasing force of the spring is variable. Accordingly, it is required that, in each of the electromagnetic valve devices, an axial position of the stopper relative to the valve housing is adequately adjusted each by each when the stopper is press fitted to the valve housing. To achieve this object, the following method is preferable, (1) assembling the electromagnetic drive member, the valve member and the spring to the valve housing, (2) pressing the stopper into the valve housing until an axial position of the stopper relative to the valve housing reaches a first position, (3) measuring and memorizing pressure of oil of the output port at the first position as a first pressure by applying a given current to the electromagnetic drive member, (4) further pressing the stopper into the valve housing beyond the first position until the axial position of the stopper relative to the valve housing reaches a second position, (5) measuring and memorizing pressure of oil of the output port at the second position as a second pressure by applying the given current to the electromagnetic member, (6) calculating a target position of the stopper relative to the valve housing corresponding to target pressure of oil of the output port when the given current is applied to the electromagnetic drive member based on a change ratio of a difference between the first and second pressures to a difference between the first and second positions, and (7) further pressing the stopper into the valve housing beyond the second position until the axial position of the stopper relative to the valve housing reaches the target position.

According to the method of manufacturing the electromagnetic valve device mentioned above, the position of the valve member is adequately adjusted by pressing the stopper to the target position so that the target pressure of oil of the output port is accurately responsive to the given current applied to the electromagnetic drive member.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS (First Embodiment)

An electromagnetic valve device 1 according to a first embodiment of the present invention, which is a spool type hydraulic control valve applicable to a hydraulic control device of an automatic transmission for a vehicle, is described with reference to FIG. 1.

Figure 1:
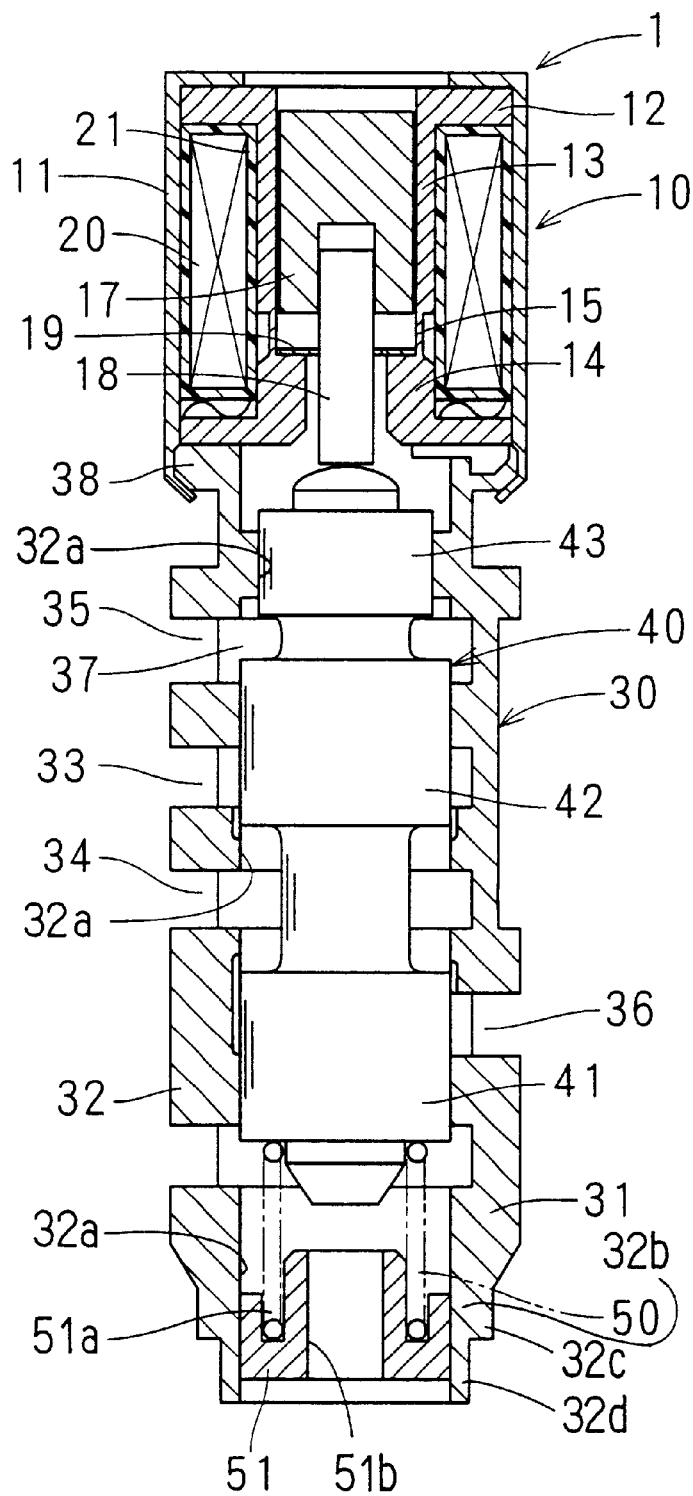
FIG. 1 is a cross sectional view of an electromagnetic valve device according to a first embodiment.

As shown in FIG. 1, the electromagnetic valve device 1 is composed of a linear solenoid 10 as an electromagnetic drive member 10 and a spool control valve 30 as a valve member. An outer diameter of the linear solenoid 10 is smaller than that of the spool control valve 30. An end of a yoke 11 of the linear solenoid 10 is crimped over a flange 38 of a valve housing 31 of the spool control valve 30 so that the linear solenoid 10 and the spool control valve are connected to each other.

The linear solenoid 10 is composed of the yoke 11, which is formed in shape of a cylinder with a bottom, a stator core 12, a plunger 17, a shaft 18, a coil 20 and so on. The yoke 11 and the stator core 12 constitute a fixed member. The plunger 17 constitutes a movable member. The yoke 11, the stator core 12 and the plunger 17, are made of magnetic material to constitute a magnetic circuit.

The stator core 12 is fixed between the yoke 11 and the valve housing 31 which are connected to each other by crimping. The stator core 12 is provided integrally with an accommodating portion 13, an attracting portion 14 and a thin thickness portion 15 bridging the accommodating portion 13 and the attracting portion 14. The thin thickness portion 15 serves as a magnetic resistance member that restricts magnetic flux flowing therethrough between the accommodating portion 13 and the attracting portion 14.

The accommodating portion 13 holds slidably the plunger 17 movable reciprocatingly therein. At least one of an inner circumferential wall of the accommodating portion 13 and an outer circumferential wall of the plunger 17 is plated with non-magnetic material such as nickel and phosphorous to minimize a clearance between the inner circumferential wall of the accommodating portion 13 and the outer circumferential wall of the plunger 17 and to increase a magnetic attracting force. Instead of plating as mentioned above, the plunger 17 may be held slidably by a cup made of non-magnetic material and placed at a circumferential clearance between the accommodating portion 13 and the plunger 17.

When the coil 20 is energized, the plunger is attracted toward the attracting portion 14 by an attracting force generated therebetween. The attracting portion 14 is provided at a position facing axially the plunger 17 with a plunger stopper 19 made of non-magnetic material. An axial end of the shaft 18 is press fitted to the plunger. The other axial end of the shaft 18 is in contact with an end of the spool 40.

The coil 20 is wound on a resin bobbin 21. When current is supplied to the coil 20 through a terminal (not shown) connected in circuit with the coil 20, the magnetic flux flows in the magnetic circuit constituted by the yoke 11, the accommodating portion 13, the attracting portion 14 and the plunger 17 so that a magnetic attracting force generates between the attracting portion 14 and the plunger 17. The magnetic attracting force exerts a downward movement of the plunger 17 in FIG. 1. The downward movement of the plunger 17 stops when the plunger 17 comes in contact with the plunger stopper 19.

The spool control valve 30 has the valve housing 31, the spool and a coil spring 50 as a biasing member urging the spool 40 toward the shaft 18. The downward movement of the plunger 17 is transmitted through the shaft 18 to the spool 40. Accordingly, the spool 40 moves reciprocatingly in the valve housing 31.

The valve housing 31 is provided with a cylinder 32 and a flange 38. An outer circumferential wall of the cylinder 32 is provided with a plurality of openings radially passing therethrough, which constitute an input port 33, an output port 34, a feedback port 35 and an ejecting port 36, respectively. Oil supplied through a pump (not shown) from an oil tank (not shown) is flowed into the input port 33. The oil is supplied from the output port 34 to an engaging device of the automatic transmission (not shown). The output port 34 communicates with the feedback port 35 through an oil conduit (not shown) outside the electromagnetic valve device 1 so that a part of the oil flowed out from the output port 34 is introduced into the feedback port 35. A feedback chamber 37 communicates with the feedback port 35. The oil is ejected from the ejecting port 36 to the oil tank.

The spool 40 is provided with a large diameter land 41, a large diameter land 42 and a small diameter land 43, which are arranged in order toward the linear solenoid 10. An outer diameter of the small diameter land 43 is smaller that that of each of the large diameter lands 41 and 42.

The feedback chamber 37 is positioned between the large diameter land 42 and the small diameter land 43 and the large and small diameter lands 42 and 43 receive feedback oil pressure of the feedback chamber 37. The feedback oil pressure to the large diameter land 42 is larger by an area difference between the large and small diameter lands 42 and 43 than that to the small diameter land 43. Accordingly, the feedback oil pressure urges the spool 40 in a direction opposite to the linear solenoid 10. Even if input pressure of oil fluctuates, output pressure does not fluctuate due to the feedback of the part of the oil output from the electromagnetic valve device 1. The spool 40 rests at a position where the biasing force of the coil spring 50, a force with which the plunger is attracted toward the attracting portion 14, when the coil is energized, so that the shaft 18 urges the spool 40, and a force which the spool 40 receives from oil pressure of the feedback chamber 37 are balanced.

The circumferential wall of cylinder 32 is provided at an axial end thereof with a small diameter portion 32b composed of a first thin thickness wall 32c and a second thin thickness wall 32d. Wall thickness of the first thin thickness wall 32b is larger than that of the second thin thickness wall 32c. The coil spring 50 urges the spool 40 toward the linear solenoid 10. A stopper 51 is press fitted and fixed substantially to an inner circumferential wall 32a of the first and second thin thickness walls 32b and 32c of the cylinder 32. The spool 40 retains an end of the coil spring 50 and the stopper 51 retains the other end of the coil spring 50 on an opposite side of the spool 40. Accordingly, the biasing force of the coil spring 50 against the spool 40 is adjusted by changing a depth to which the stopper 51 is press fitted to the cylinder 32. An outer diameter of the stopper 51 is larger than an inner diameter of the inner circumferential wall 32a of the cylinder 32 in a state before the stopper 51 is press fitted to the cylinder 32. The stopper 51 has a ring shaped groove 51a within which the coil spring 50 is partly accommodated and whose bottom retains the coil spring 50 and a center hole 51b. When the stopper 51 is press fitted to the cylinder 32, radially outward resilient deformation of the small diameter portion 32b having the first and second thin thickness walls 31c and 31d is larger than radially inward resilient deformation of the stopper 51 so that the stopper 51 is rigidly fixed to the cylinder 32. That is, radial expansion value of the small diameter portion 32b is larger than radial compression value of the stopper. It is preferable that an axial length of the stopper 51 is not shorter than 1 mm.

An amount of oil flowing from the input port 33 to the output 34 is decided by an axial length (seal length) of the large diameter land 42 that is overlapped with the inner circumferential wall 31a of the cylinder 32. As the seal length is shorter, the amount of oil flowing from the input port 33 to the output 34 is larger and, as the seal length is longer, the amount of oil flowing from the input port 33 to the output 34 is smaller. Similarly, an amount of oil flowing from the output port 34 to the ejecting port 36 is decided by an axial length (seal length) of the large diameter land 41 that is overlapped with the inner circumferential wall 31a of the cylinder 32.

An operation of the electromagnetic valve device 1 is described.

When the coil 20 is energized and the spool 40 moves toward the coil spring 50, that is, in a lower direction in FIG. 1, the seal length of the large diameter land 42 with the inner circumferential wall 31a becomes longer and the seal length of the large diameter land 41 with the inner circumferential wall 31a becomes shorter so that the amount of oil flowing from the input port 33 to the output port 34 becomes smaller and the amount of oil flowing from the output port 34 to the ejecting port 36 becomes larger. As a result, pressure of the oil flowed out from the output port 34 becomes lower.

On contrary, when the spool 40 moves toward the linear solenoid 10, the seal length of the large diameter land 42 with the inner circumferential wall 31a becomes shorter and the seal length of the large diameter land 41 with the inner circumferential wall 31a becomes longer so that the amount of oil flowing from the input port 33 to the output port 34 becomes larger and the amount of oil flowing from the output port 34 to the ejecting port 36 becomes smaller. As a result, pressure of the oil flowed out from the output port 34 becomes higher.

According to the electromagnetic valve device mentioned above, an amount of current to be supplied to the coil 20 governs a force with which the linear solenoid 10 pushes the spool 40 in a direction opposite to the linear solenoid 10 so that, if the amount of current is changed, the pressure of oil flowed out from the output port 34 is changed. That is, the pressure of oil flowed out from the output port 34 is proportional in reverse to a value of the current supplied to the coil 20. Accordingly, pressure of oil applied to the automatic transmission can be adjusted by changing the current to be applied to the coil 20 and changing a position of the spool 40 in the cylinder 32.

A method of manufacturing the electromagnetic device 1 is described below.

The electromagnetic valve device is assembled by (1) pressing the stopper 51 into the valve housing 31 until a position of the stopper 51 relative to valve housing 31 reaches a first position where an axial length of the stopper 51 actually pressed into the valve housing 31 is relatively short;

(2) measuring first pressure of oil at the output port 34 at the first position when a given current is applied to the coil;

(3) further pressing the stopper into the valve housing 31 until a position of the stopper 51 relative to the valve housing 31 reaches a second position where the axial length of the stopper 51 actually pressed into the valve housing 31 is longer than that at the first position;

(4) measuring second pressure of oil at the output port 34 at the second position when the given current is applied to the coil 20;

(5) calculating a change ratio of the pressure of oil at the output port 34 to the position of the stopper relative to the valve housing 31 from a difference between the first and second pressures and a difference between the first and second positions;

(6) based on the change ratio calculated in (5), calculating a target position where the axial length of the stopper 51 actually pressed into the valve housing 31 is longer than that at the second position and a target pressure of oil at the output port 34 (a center value within the target ranges) generates when the given current is applied to the coil 20; and (7) further pressing the stopper 51 into the valve housing 51 until a position of the stopper 51 relative to the valve housing 31 reaches the target position calculated in (6).

Figure 2:
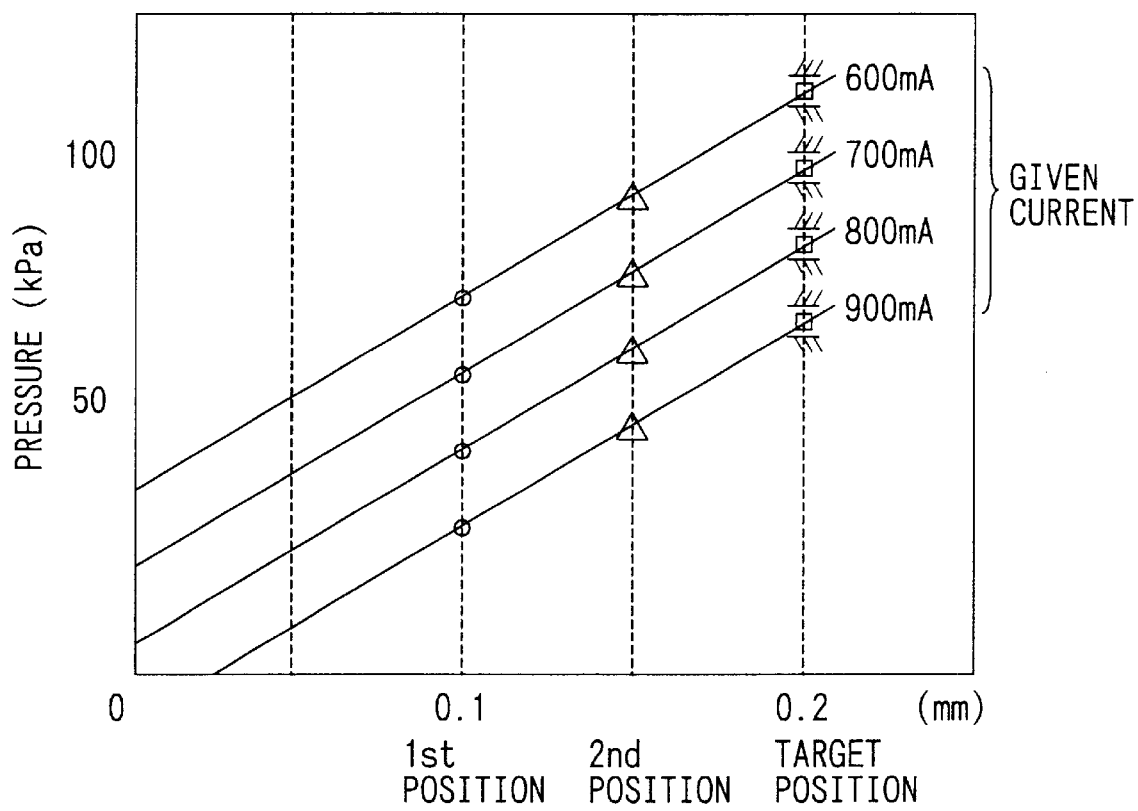
FIG. 2 is a chart showing relationships among an axial position of a stopper relative to a valve housing, pressure of oil of an output port and a given current applied to a coil according to the first embodiment.

As shown in a chart of FIG. 2, from an extended line connecting a first cross point of the first position and the first pressure and a second cross point of the second position and the second pressure, the target position corresponding to the target pressure at a given current, for example, at one of 900 mA, 800 mA, 700 mA and 600 mA, can be calculated. Accordingly, if the stopper 51 is pressed into the valve housing 31 to reach the target position, the target pressure of oil at the output port 34 is always accurately secured when the given current is applied to the coil 20.

In the electromagnetic valve device 1, the change rate at a given current, for example, at 900 mA, may be slightly different from the change rate at another given current, for example, at 600 mA. That is, inclinations of the respective lines shown in FIG. 2 may be different. Therefore, when the stopper 51 is press fitted to the valve housing 31 to meet the target position calculated based on the first given current, pressure of oil at the output port 34 may be slightly shifted from a center value within the given range when the another given current is applied to the coil 20. In this case, the target position based on the first given current may be revised in such a manner that the target position is multiplied by a certain coefficient.

According to the first embodiment, the stopper 51 is press fitted and fixed to the inner circumferential wall 32a of the cylinder 32 without providing threads both in the inner circumferential wall of the cylinder and the outer circumferential wall of the stopper 51. Accordingly, the valve housing 31 and the stopper 51 are easily manufactured with less cost.

Further, instead of press fitting the stopper 51 to the valve housing 31, the stopper 51 may be simply inserted into the valve housing 31 whose diameter of the inner circumferential wall 32a of the cylinder 32 is slightly larger than diameter of the outer circumference of the stopper 51 and, then, the stopper 51 may be fixed to the valve housing 31 with adhesive primarily coated on the circumference of the stopper 51 or by welding.

(Second Embodiment)

Figure 3:
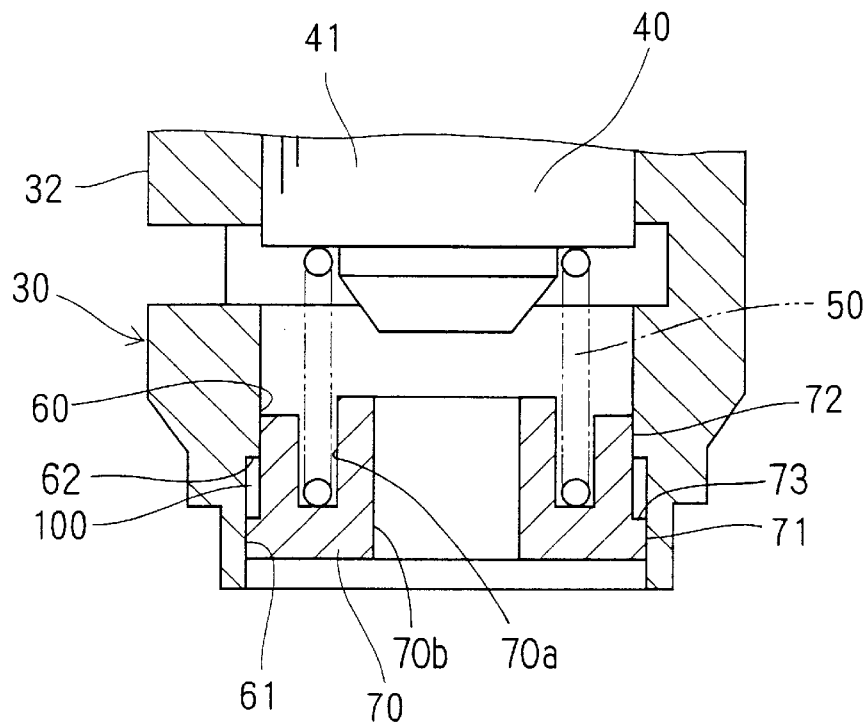
FIG. 3 is a cross sectional view of a stopper and a valve housing of an electromagnetic valve according to a second embodiment.

A second embodiment of the present invention is described with reference to FIG. 3.

A stopper 70 have a ring shaped groove 70a and a center hole 70c, similarly as the first embodiment.

An inner circumferential wall 32a of a cylinder 32 is provided with a small diameter inner surface 60, a large diameter inner surface 61 and an inner step surface 62 bridging the small and large diameter inner surfaces 60 and 61. The large diameter inner surface 61 is positioned at an axial end of the inner circumferential wall 32a. On the other hand, the stopper 70 is provided with a large diameter outer surface 71 that is press fitted to a part of the large diameter inner surface 61, a small diameter outer surface 72 that is press fitted to a part of the small diameter inner surface 60, and an outer step surface 73 bridging the large and small diameter outer surfaces 71 and 72. A ring shaped space 100 is formed by the other part of the small diameter outer surface 72, the other part of the large diameter inner surface 61 and the inner and outer step surfaces 62 and 73. When the small diameter outer surface 72 is press fitted to the small diameter inner surface 60 and the large diameter outer surface 71 is press fitted to the large diameter inner surface 61, chips and burrs due to press fitting are partly accommodated and trapped in the ring shaped space 100 so that the chips and burrs are hardly mixed in the oil and the spool 40 can be moved smoothly in the cylinder 32.

Figure 4:
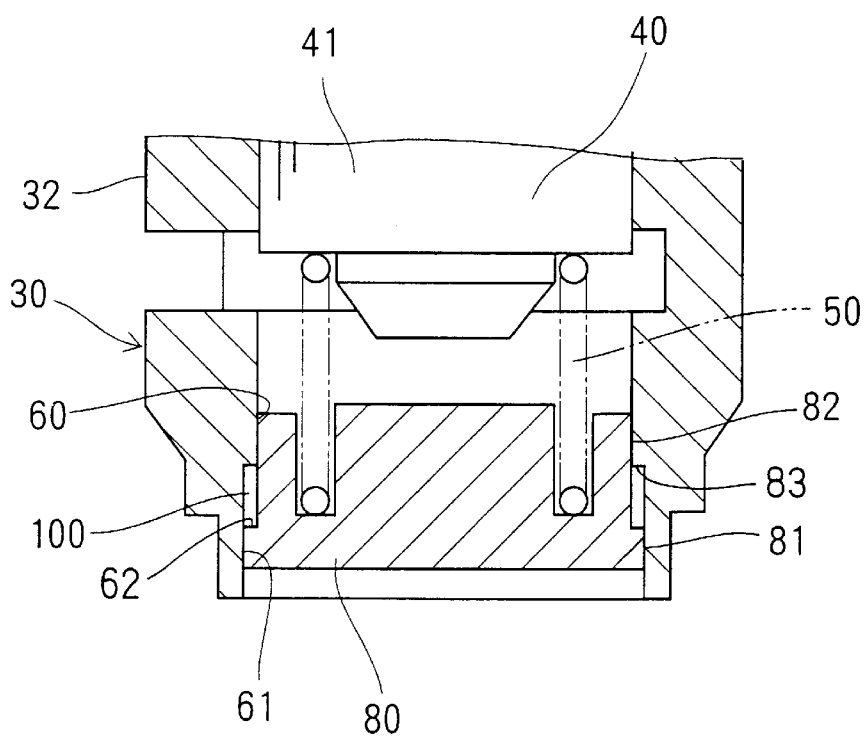
FIG. 4 is a cross sectional view of a stopper and a valve housing of an electromagnetic valve according to a modification of the second embodiment.

A modification of the second embodiment is described with reference to FIG. 4. A stopper 80 is similar to the stopper 70 of the second embodiment except that the stopper 80 doesn't have the center hole 70b provided in the stopper 70. A ring shaped space 100 is formed by a small diameter outer surface 82, the large diameter inner surface 61, the inner step surface 62 and an outer step surface 83. When the small diameter outer surface 82 is press fitted to the small diameter inner surface 60 and the large diameter outer surface 81 is press fitted to the large diameter inner surface 61, chips and burrs due to press fitting are partly accommodated and trapped in the ring shaped space 100.

The electromagnetic valve device according to any one of the embodiments mentioned above is applicable not only to the hydraulic control valve of the automatic transmission but also any valve devices of fluid control system such as a hydraulic control valve of a valve timing adjusting device.

Further, instead of decreasing the pressure of oil to be output from the output port 34 according to increase of current applied to the coil 20, the electromagnetic valve device 1 according to any one of the embodiments mentioned above may be modified so that the pressure of oil to be output from the output port 34 is increased according to increase of current applied to the coil 20.

Moreover, in the embodiments mentioned above, instead of the displacements of the plunger 17 and the spool 40 in proportion to the current applied to the coil 20 for variably control the pressure of oil to be output from the output port 34, the spool 40 and the valve housing 32 may be modified in such a manner that the spool 40 is displaced only between two positions for controlling so as to change over the ports provided in the valve housing according to an on-off control of current applied to the coil 20.

What is claimed is:

1. An electromagnetic valve device comprising:
    a valve housing having a cylindrical wall and a plurality of ports passing radially through the cylindrical wall, the cylindrical wall being provided at an axial end of the valve housing with a small diameter portion whose wall thickness is thinner;
    a valve member slidably accommodated in the cylindrical wall to control communications among the ports according to an axial displacement thereof;

a spring which is positioned at the axial end of the valve housing and whose end is retained by an end of the valve member and urges the valve member toward another axial end of the valve housing;

a stopper retaining another end of the spring; and an electromagnetic drive member in contact with another end of the valve member for generating, when energized, a driving force to displace the valve member against a biasing force of the spring, wherein the stopper is press fitted substantially to an inner circumferential surface of the small diameter portion of the cylindrical wall so that radially outward resilient deformation of the small diameter portion is larger than radially inward resilient deformation of the stopper.

2. An electromagnetic valve device according to claim 1 wherein an axial length of the stopper is not shorter than 1 mm.

3. An electromagnetic valve according to claim 1 wherein the cylindrical wall is provided at an inner circumferential surface on a side of the axial end thereof with a small diameter inner surface, a large diameter inner surface and an inner step surface bridging the small and large diameter inner surfaces, and the stopper is provided with a large diameter outer surface press fitted to a part of the large diameter inner surface, a small diameter outer surface press fitted to a part of the small diameter inner surface and an outer step surface bridging the large and small diameter outer surfaces so that a ring shaped space, which is formed by the other part of the small diameter outer surface, the other part of the large diameter inner surface and the inner and outer step surfaces, accommodates chips and burrs due to press fitting.

* * * * *